(12) United States Patent
Smokovich et al.

(10) Patent No.: US 7,981,191 B2
(45) Date of Patent: Jul. 19, 2011

(54) METHOD FOR THE PRODUCTION OF TANTALUM POWDER USING RECLAIMED SCRAP AS SOURCE MATERIAL

(75) Inventors: Joseph Smokovich, Old Field, NY (US); Craig F. Hafner, Bridgewater, NJ (US)

(73) Assignee: Hi-Temp Specialty Metals, Inc., Willingboro, NJ (US)

( * ) Notice: Subject to any disclaimer, the term of this patent is extended or adjusted under 35 U.S.C. 154(b) by 433 days.

(21) Appl. No.: 12/248,350

(22) Filed: Oct. 9, 2008

(65) Prior Publication Data
US 2009/0095130 A1    Apr. 16, 2009

Related U.S. Application Data

(60) Provisional application No. 60/979,949, filed on Oct. 15, 2007.

(51) Int. Cl.
B22F 9/04 (2006.01)
(52) U.S. Cl. .......................... 75/356; 75/360
(58) Field of Classification Search .............. 75/356, 75/360
See application file for complete search history.

(56) References Cited

U.S. PATENT DOCUMENTS

| | | |
|---|---|---|
| 2,950,966 A | 8/1960 | Foos |
| 3,635,693 A | 1/1972 | Friedrich et al. |
| 3,653,850 A | 4/1972 | Eberts |
| 3,976,475 A | 8/1976 | Markland |
| 4,017,302 A | 4/1977 | Bates et al. |
| 4,126,493 A | 11/1978 | Wurm |
| 4,141,719 A | 2/1979 | Hakko |
| 4,446,115 A | 5/1984 | Endo et al. |
| 4,490,340 A | 12/1984 | Ritsko et al. |
| 4,495,158 A | 1/1985 | Ritsko et al. |
| 4,537,750 A | 8/1985 | Ritsko et al. |
| 4,673,554 A | 6/1987 | Niwa et al. |
| 4,722,756 A | 2/1988 | Hard |
| 4,727,928 A | 3/1988 | De Vynck et al. |
| 4,740,238 A | 4/1988 | Schiele |
| 4,877,445 A | 10/1989 | Okudaira et al. |
| 4,923,531 A | 5/1990 | Fisher |
| 5,022,935 A | 6/1991 | Fisher |
| 5,023,059 A | 6/1991 | Bielecki et al. |
| 5,209,910 A | 5/1993 | Bludssus et al. |
| 5,234,491 A * | 8/1993 | Chang ............ 75/622 |
| 5,352,270 A | 10/1994 | Shackle |
| 5,437,848 A | 8/1995 | Hard |
| 5,448,447 A | 9/1995 | Chang |
| 5,468,464 A | 11/1995 | Rossback et al. |
| 5,635,146 A | 6/1997 | Singh et al. |
| 5,954,856 A | 9/1999 | Pathare et al. |
| 5,986,877 A | 11/1999 | Pathare et al. |
| 5,993,513 A | 11/1999 | Fife |
| 6,010,676 A | 1/2000 | Singh et al. |
| 6,171,363 B1 | 1/2001 | Shekhter et al. |
| 6,193,779 B1 | 2/2001 | Reichert et al. |
| 6,231,636 B1 | 5/2001 | Froes et al. |
| 6,238,456 B1 | 5/2001 | Wolf et al. |
| 6,312,642 B1 | 11/2001 | Fife |
| 6,338,832 B1 | 1/2002 | Brown et al. |
| 6,350,406 B1 | 2/2002 | Satou et al. |
| 6,383,459 B1 | 5/2002 | Singh et al. |
| 6,402,066 B1 | 6/2002 | Habecker et al. |
| 6,558,447 B1 | 5/2003 | Shekhter et al. |
| 6,592,830 B1 | 7/2003 | Krupin et al. |
| 6,706,240 B2 | 3/2004 | Habecker et al. |
| 6,843,970 B1 | 1/2005 | Hard |
| 6,953,120 B2 | 10/2005 | Deveau et al. |
| 6,979,429 B2 | 12/2005 | Hard et al. |
| 7,142,408 B2 | 11/2006 | Wang et al. |
| 7,156,893 B2 | 1/2007 | Habecker et al. |
| 7,182,925 B2 | 2/2007 | Gaur et al. |
| 7,214,362 B2 | 5/2007 | Kikuyama et al. |
| 2003/0170158 A1 | 9/2003 | Hard et al. |
| 2003/0174459 A1 | 9/2003 | Noguchi et al. |
| 2004/0213716 A1 | 10/2004 | Gaur et al. |
| 2005/0118052 A1 | 6/2005 | Aimone et al. |
| 2005/0123459 A1 | 6/2005 | Kikuyama et al. |
| 2005/0158227 A1 | 7/2005 | Dobbs |
| 2005/0279187 A1 | 12/2005 | Shekhter et al. |
| 2006/0174727 A1 | 8/2006 | Bick et al. |
| 2007/0068341 A1 * | 3/2007 | Cheng et al. .......... 75/255 |
| 2007/0172377 A1 | 7/2007 | Fife et al. |

FOREIGN PATENT DOCUMENTS

| | | |
|---|---|---|
| DE | 4121919 A1 | 1/1993 |
| JP | 56114831 A | 9/1981 |
| JP | 59146942 A | 8/1984 |
| JP | 62056506 A | 3/1987 |
| JP | 63235435 A | 9/1988 |
| JP | 01073028 A | 3/1989 |
| JP | 01075632 A | 3/1989 |
| JP | 01320229 A | 12/1989 |
| JP | 03028334 A | 2/1991 |

(Continued)

OTHER PUBLICATIONS

English language Abstract for JP 2003160892 A, Jun. 6, 2003.

(Continued)

Primary Examiner — George Wyszomierski
(74) Attorney, Agent, or Firm — Norris McLauglin & Marcus, P.A.

(57) ABSTRACT

A process for obtaining tantalum powder from tantalum containing scrap material is provided. The process includes selecting source material, such as from sintered anodes for capacitors, hydriding the source material, milling to desired particle size and surface area, dehydriding, deoxidizing, agglomerating, sifting, and acid treating to obtain tantalum powder of a desired size and purity.

5 Claims, No Drawings

FOREIGN PATENT DOCUMENTS

| | | | |
|---|---|---|---|
| JP | 2000016815 A | 1/2000 | |
| JP | 2002363662 A | 12/2002 | |
| JP | 2003160892 A | 6/2003 | |
| WO | WO 97/40199 A1 | 10/1997 | |
| WO | WO 9738143 A1 | 10/1997 | |
| WO | WO 2005/105346 A1 | 11/2005 | |

OTHER PUBLICATIONS

English language Abstract for JP 2002363662 A, Dec. 18, 2002.
English language Abstract for JP 2000016815 A, Jan. 18, 2000.
English language Abstract for JP 03028334 A, Feb. 6, 1991.
English language Abstract for JP 01320229 A, Dec. 26, 1989.
English language Abstract for JP 01075632 A, Mar. 22, 1989.
English language Abstract for JP 01073028 A, Mar. 17, 1989.
English language Abstract for JP 63235435 A, Sep. 30, 1988.
English language Abstract for JP 62056506 A, Mar. 12, 1987.
English language Abstract for JP 59146942 A, Aug. 23, 1984.
English language Abstract for JP 56114831 A, Sep. 9, 1981.
English language Abstract for WO 2005/105346 A1, Nov. 10, 2005.
English language Abstract for DE 4121919 A1, Jan. 7, 1993.

* cited by examiner

METHOD FOR THE PRODUCTION OF TANTALUM POWDER USING RECLAIMED SCRAP AS SOURCE MATERIAL

CROSS REFERENCE TO RELATED APPLICATION

This application claims the benefit of U.S. Provisional Patent Application No. 60/979,949, filed Oct. 15, 2007, the entirety of which is hereby incorporated by reference into this application.

FIELD OF THE INVENTION

The invention relates to metal tantalum powder. More particular the invention relates to processes for the production of tantalum powder

DESCRIPTION OF THE RELATED ART

Capacitors have been produced from tantalum powder for many years. For example, tantalum powder may be manufactured by molten sodium reduction of potassium heptafluorotantalate, $K_2TaF_7$ which is produced by digesting tantalum ore or tantalum scrap in hydrofluoric acid, separating the tantalum values by solvent extraction and precipitating $K_2TaF_7$. Another method involves milling of hydrided ingot. The ingots are typically melted in an electron beam furnace under vacuum to achieve the very high melting temperature of tantalum, about 3000° C.

Such conventional methods are expensive. Additionally, the use of hydrofluoric acid poses a hazard to technicians and equipment. Improvements to the process for producing tantalum powder are constantly desired in the marketplace. Tantalum capacitors are used for a wide range of applications from very high reliability military and medical applications to commercial applications and consumer electronics.

It would be desirable to have a more cost effective method to produce tantalum powder. It would be desirable to have a method and process to produce commercial grade capacitor powder from reclaimed tantalum scrap that does not require hydrofluoric acid digestion or re-melting the material into ingots.

SUMMARY OF THE INVENTION

Methods for converting processed tantalum source material into usable capacitor grade powder are described. The material may be from a variety of sources but is preferably from tantalum scrap. Such tantalum scrap includes tantalum anodes made from sintered powder, deoxidized tantalum anodes or from other high purity tantalum scrap such as fabricated sheet made from ingot.

The use of scrap material to obtain tantalum powder presents several challenges as compared to virgin material, including the presence of varying amounts of impurities, some of which must be removed prior to processing. The powder is prepared by first sorting material, removing contaminants below acceptable levels, processing to achieve the desired surface area and then further treating to form an agglomerated capacitor powder.

The invention has many advantages over conventional processes to obtain tantalum powder. Commercial grade capacitor powder from tantalum scrap is obtained by the inventive processes without using hydrofluoric acid digestion or having to initially or subsequently re-melt the source material to ingots. The elimination of the these steps from conventional processes is significantly more economical, saves time and reduces the considerable hazards associated with chemicals such as hydrofluoric acid.

In one embodiment method for producing tantalum powder from tantalum containing source material is provided. The method comprises the steps of hydriding the source material, crushing and milling the hydrided source material to form a powder, dehydiding and agglomerate the powder to form agglomerates, deoxidize the agglomerated powder; and optionally crushing and sifting the agglomerates to a desired particle size. Optionally, the method includes additional steps depending on the source material and the requirements of the final powder. These steps include, among others, acid treating the deoxidized crushed agglomerated powder, crushing and sifting the deoxidized crushed agglomerated powder to a desired particle size, treating the scrap material to remove contaminates prior to the step of hydriding the scrap material.

In one embodiment the step of crushing and milling the hydrided scrap forms a powder with a surface area between about 0.5 and 2.0 $m^2/g$. In another embodiment the agglomerates are formed of about 100 microns. The agglomerates may be crushed and sifted prior to the step of deoxidizing the agglomerates. The step of deoxidizing the agglomerated powder may be performed by mixing the agglomerates with Magnesium metal and heating under an inert gas.

The tantalum containing source material can be in a variety of forms. In one embodiment the tantalum scrap comprises tantalum capacitor anodes and/or manufacturing scrap from sheet and wire.

A method is provided of producing powder from reclaimed capacitor anodes that are sintered tantalum powder around a central tantalum wire. The method includes the steps of hydriding the material by heating the material in vacuum then backfilling with hydrogen, lightly milling the hydrided anodes to liberate the tantalum wire, sifting the milled anodes to separate the tantalum wire from the powder, heat treating the powder in two or more steps to dehydride, deoxidize, and agglomerate the powder and crushing the agglomerates and sifting to produce a particle size distribution capable of being pressed and sintered to re-form capacitor anodes.

Optionally, the initial steps of sampling the anodes to determine initial contamination levels and acid leaching the anodes to remove metallic contamination is performed. The acid treated anodes are then rinsed to remove acid residue and the rinsed anodes are dried. In an another embodiment the step of removing the oxide layer by heating with Mg at sufficient temperature and time to at least partially remove the oxide layer before the step of hydriding is included.

DETAILED DESCRIPTION OF THE INVENTION

A process for obtaining tantalum powders from selected source material is provided. The source material must have a high concentration of tantalum but need not be in the form of ingots as is required by conventional techniques. The selection of source material is based on the form of the material and the amount and type of chemical contamination. The source material is thin, preferably less than about 2 mm, such as sheet or wire. Thin source material allows for easier and more complete hydriding. Acceptable forms include, but not limited to, thin sheet, sintered powder compacts (anodes), deoxidized anodized anodes from capacitors and wire.

One preferred source material is tantalum scrap, such as various recycled tantalum materials including tantalum capacitor anodes, manufacturing scrap from high purity sheet and wire as well as other high purity tantalum scrap. One important feature of the invention is that the form of the source material need not be altered or changed to any specific form prior to treatment. For example, when the tantalum source material is scrap, the scrap need not be digested with HF acid and ultimately reduced with molten Sodium metal to form powder, or alternately melted at 3000° C. in an electron beam furnace to form ingots, both of which processes have high associated costs as well as hazards.

Once selected, the source material is subjected to a process that includes a number of steps to produce the tantalum powder. In one embodiment, the selected source material is initially chemically treated to remove contaminants. The specific treatment depends on the specific contaminates present in the scrap and also depends on the desired purity of the final tantalum powder. For example, for many contaminates, the contamination can be leached or dissolved to sufficiently low levels by conventional means such as acid leaching in Hydrochloric, Nitric, or Sulfuric Acid or combinations of these acids, with or without additional oxidizing agents.

The treatment will also depend on the desired purity of the finished tantalum powder. In some instances, if the starting source material is of sufficient purity in relation to the desired final powder, no initial treatment is required. Those skilled in the art will readily be able to determine what treatment is necessary for the intended source material.

The source material is then hydrided using conventional techniques. For example, source material is heated in vacuum and then backfilled with Hydrogen. Hydriding makes the source material brittle and more easily crushed and milled, which is the next step in the process. Those skilled in the art will readily be able to determine an operative temperature/time profile to yield a high degree of Hydrogen uptake. Generally, the greater the Hydrogen uptake, the more brittle the source material and the easier it is to mill. The thicker the source material, the more difficult it becomes to hydride as there is typically a gradient of Hydrogen concentration from the surface to the interior of thick pieces.

Once hydrided, the hydrided material is crushed and milled to a powder. The equipment used for crushing and milling is that typically used for milling metal. The specific process for crushing and milling the material will depend on the desired properties for the finished powder. For example, if the finished powder is intended to be commercial grade tantalum powder for, then the hydrided material is preferably milled to a fine powder with a relatively high surface area between about 0.5 and about 2.0 $m^2/g$. By "commercial grade," it is generally understood to mean non-military, usually consumer products requiring a lower degree of reliability and a wider operating specification. For example handheld devices: cell phones, games, etc are included in consumer grade applications. The finer the powder the more capacitance per gram, CV/g., which is one of the major price factors in Ta powder.

The crushed and milled powder is then dehydrided. Preferably the Tantalum is heated to about 1300° F., in a vacuum to dehydride the powder. Under the right conditions the dehydrided powder will agglomerate to produce agglomerates. For example, if the temperature is then increased to 2000° F. agglomeration will occur. Such agglomerates will typically be of about 50 microns to about 250 microns; preferably the agglomerates are about 100 microns as these agglomerates have good flow characteristics, which is important for filling the small molds used to press the powder into anodes.

The agglomerated powder is then optionally crushed and sifted to remove undersized and oversized material thereby obtaining a sifted powder. This step is done to improve the uniformity of the powder. Again uniformity of material size is an important property when the powder is to be used for producing anodes. In other instances when uniformity is not as critical, the powder need not be crushed or sifted.

Preferably, the sifted powder is subsequently deoxidized. This is done to lower the oxygen content in the powder. In many common applications of tantalum powder, it is desirable to minimize the amount of dissolved oxygen in the tantalum powders. In one embodiment, deoxidizing the powder is performed by mixing the powder with magnesium metal and heating under inert gas at elevated temperature, such as about 1,200° F. to about 1,600° F., preferably about 1,450° F. In many instances when high purity is desired, the deoxidized powder is acid treated, such as for example with warm Hydrochloric, Sulfuric Acid and Peroxide, Nitric Acid and Hydrochloric, or Niric Acid and Hydroflouric. This removes the magnesium and other metallic impurities added during milling and deoxidizing.

The deoxidized and acid treated powder is again crushed and optionally sifted to a desired particle size to obtain a tantalum powder. In one embodiment, the powder is crushed and sifted to a particle size of about 1.0 $m^2/g$, as this size is readily obtainable, easily deoxidized, and produces a good CV/g in the 15 k to 30 k range.

In alternate embodiments of the invention, one or more optional steps are included for producing tantalum powder from a tantalum containing source material. The specific form of the source material and the specific content and concentration of contaminates often require different steps to produce tantalum powder.

For example, in one embodiment, the source material includes reclaimed capacitor anodes comprising sintered tantalum powder around a central tantalum wire. In this embodiment, the process includes testing and selecting the source material. Samples of source material are tested to determine initial contamination levels of the source material. The testing is done by conventional testing methods known to those skilled in the art. The testing may reveal that certain samples contain too much of a particular contaminate and therefore not used.

For example, high levels of Nb, W, or Si are difficult to remove and therefore, materials containing these contaminates are typically not suitable for most applications. For another example, high levels of Mo typically require further testing to determine if the Mo is on the surface only, or in the interior of the material. For another example, high levels of Carbon also require further testing to determine the most effective removal efficiency. Most other normally present contamination can be removed by conventional methods know to those in the art. Depending on the results of the testing, the material may be subjected to acid leaching to remove metallic contamination identified in the testing. If acid treated, the material is then rinsed to remove acid residue and then dried.

The dried material is hydrided as described above, for example by heating the material in vacuum then backfilling with hydrogen. The hydrided material is milled, preferably light milling to liberate any tantalum wire. Tantalum wire typically contains a high silica content. If the wire does have high silica content, it is preferably separated from the powder so as not to contaminate the powder. The wire can be separated from the usable powder by sifting. The powder is heat treating to dehydride, deoxidize, and agglomerate the powder. The heat treatment is preferably performed in one or more steps, such as in two or more steps, or in several steps.

In one embodiment the steps of dehydriding, deoxidizing, and agglomerating is performed in a single step. The hydrided powder is pre-blended with Magnesium and put in a vacuum oven. A vacuum of about ($7.5 \times 10^{-4}$ Torr) is pulled and heated to 1300° F. until outgassing stops (dehydriding). The heat is increased to a temperature of about 1650° F. for about 3 hours (deoxidizing) and then increased to about 2000° F.-2400° F. for about 30 minutes (agglomerating).

Finally the agglomerates are crushed and optionally sifted to produce a particle size distribution capable of being pressed and sintered to re-form capacitor anodes.

In a further embodiment, the source material is capacitor anodes that have been anodized. The anodized capacitor anodes have an oxide film which serves as a dielectric between the anode and the cathode in tantalum capacitors. The oxide film must be removed to a sufficient degree prior to the step of hydriding. In this further embodiment, the process for making metal powder from this type of source material may comprise the step of removing the oxide layer from the anodized capacitor anodes. This can be accomplished by heating the capacitor anodes with magnesium for a sufficient temperature and time to remove enough of the oxide layer to permit hydriding during the hydriding step. This step may be performed as a preprocessing step discussed above, or may be performed at any point in the process prior to the hydriding step discussed above.

In another aspect of the invention, a process is provided to manufacture tantalum powder from source material that is thin sheet. For example, the source material may be a thin sheet formed by rolling pure tantalum ingot into sheet material. Preferably, such sheet material has a thickness less than about 15 mm, and more preferably less than about 5 mm, and most preferably in a range from about 0.001 mm to about 5 mm.

The tantalum powder reclaimed through the processes described herein is can produce high quality powder such as that acceptable for use as sintered anodes for capacitors. As such, the processes may be adapted to produce agglomerated capacitor powder. Application of the processes described herein to obtain tantalum powder having properties, such as size and purity, for applications other than to capacitors are also within the scope of the invention.

The following Examples are provided to illustrate embodiments of this invention. Other specific applications of the teachings in this patent application can be used without departing from the spirit of this invention. Other modifications of the methods can be used, and are considered to be within the scope of this invention.

EXAMPLE 1

25 kg of sintered, not anodized, gray anodes were washed to remove carbon residue, acid treated in 50% $HNO_3$ followed by HCl to remove metallic contamination. Subsequently the anodes were thoroughly rinsed and dried. The clean anodes were then sampled and analyzed. The results are provided in Table 1.

TABLE 1

| Contaminate | Concentration |
| --- | --- |
| C | 65 ppm |
| Cr | 15 ppm |
| Fe | 133 ppm |
| Mn | 1 ppm |
| N | 77 ppm |
| Ni | <10 ppm |
| O | 0.318% |
| Zr | <1 ppm |

The sample was hydrided by backfilling a vacuum oven to a positive pressure with Hydrogen at 482° C. for 3 hours. The hydrided sample was wet milled with tantalum media for 30 minutes then sifted to separate the Ta wire from the remaining material. The remaining material was milled for an additional 6 hrs to form a powder. The powder was rinsed and dried at 100° C. for 24 hours. The powder was tested with a Fischer SubSieve Sizer and had a particle size of 1.1 μm and a BET surface area of 1.1 $m^2/g$.

This powder was then dehydrided at 700° C. and agglomerated at 1300° C. for 30 minutes. The resulting agglomerates were crushed, sifted to −80 mesh, blended with Mg turnings and deoxidized at 900° C. for 6 hours.

The resulting power was acid treated with 50% $HNO_3$ followed by conc. HCl to remove residual Mg. The powder was then rinsed and dried and then tested for particle size distribution. The mean diameter was 45 μm with 94% being 100 μm or less. The powder was pressed and sintered and tested for wet leakage. At 60 V the anodes had a wet leakage of 1.5 nA/CV.

EXAMPLE 2

25 kg of thin Tantalum Sheet with an average thickness of 2 mm and a starting Oxygen content of <100 ppm was hydrided and milled as in Example 1. The final particle size and BET surface area was 2.5 μm and 0.79 $m^2/g$ respectively.

There will be various modifications, adjustments, and applications of the disclosed invention that will be apparent to those of skill in the art, and the present application is intended to cover such embodiments. Accordingly, while the present invention has been described in the context of certain preferred embodiments, it is intended that the full scope of these be measured by reference to the scope of the following claims.

What is claimed is:

1. A method of producing powder from reclaimed capacitor anodes of a material comprising sintered tantalum powder around a central tantalum wire comprising the step of:
    hydriding the material by heating the material in vacuum then backfilling with hydrogen;
    lightly milling the hydrided anodes to liberate the tantalum wire;
    sifting the milled anodes to separate the tantalum wire from the powder;
    heat treating the powder in one or more steps to dehydride, deoxidize, and agglomerate the powder; and
    crushing the agglomerates and sifting to produce a particle size distribution capable of being pressed and sintered to re-form capacitor anodes.

2. The method of claim 1 further comprising the initial steps of sampling the anodes to determine initial contamination levels and treating the anodes to at least partially remove the contamination.

3. The method of claim 2 wherein the treating the anodes is done by acid leaching the anodes.

4. The method of claim 3 further comprising the steps of rinsing the acid treated anodes to remove acid residue and drying the rinsed anodes.

5. The method of claim 1 further wherein the capacitor anode contains an oxide film and further comprising the step of removing the oxide film by heating with Mg at sufficient temperature and time to at least partially remove the oxide film before the step of hydriding.

* * * * *